Dec. 3, 1940. A. L. KELTNER 2,223,488
EVAPORATION PLANT
Filed May 20, 1938 2 Sheets-Sheet 1
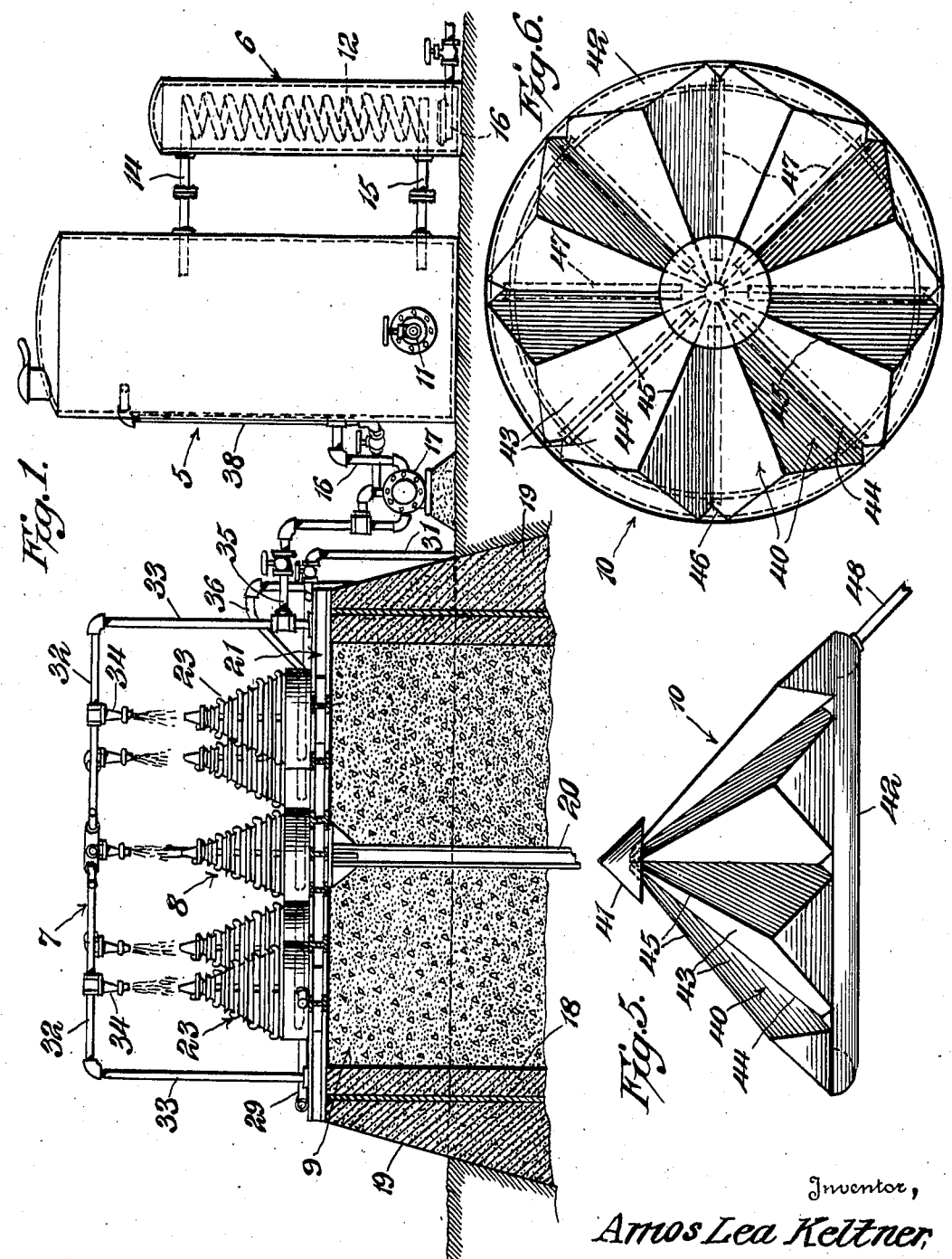
Inventor,
Amos Lea Keltner,
By Baldwin & Wight
his Attorneys.

Dec. 3, 1940.  A. L. KELTNER  2,223,488
EVAPORATION PLANT
Filed May 20, 1938  2 Sheets-Sheet 2
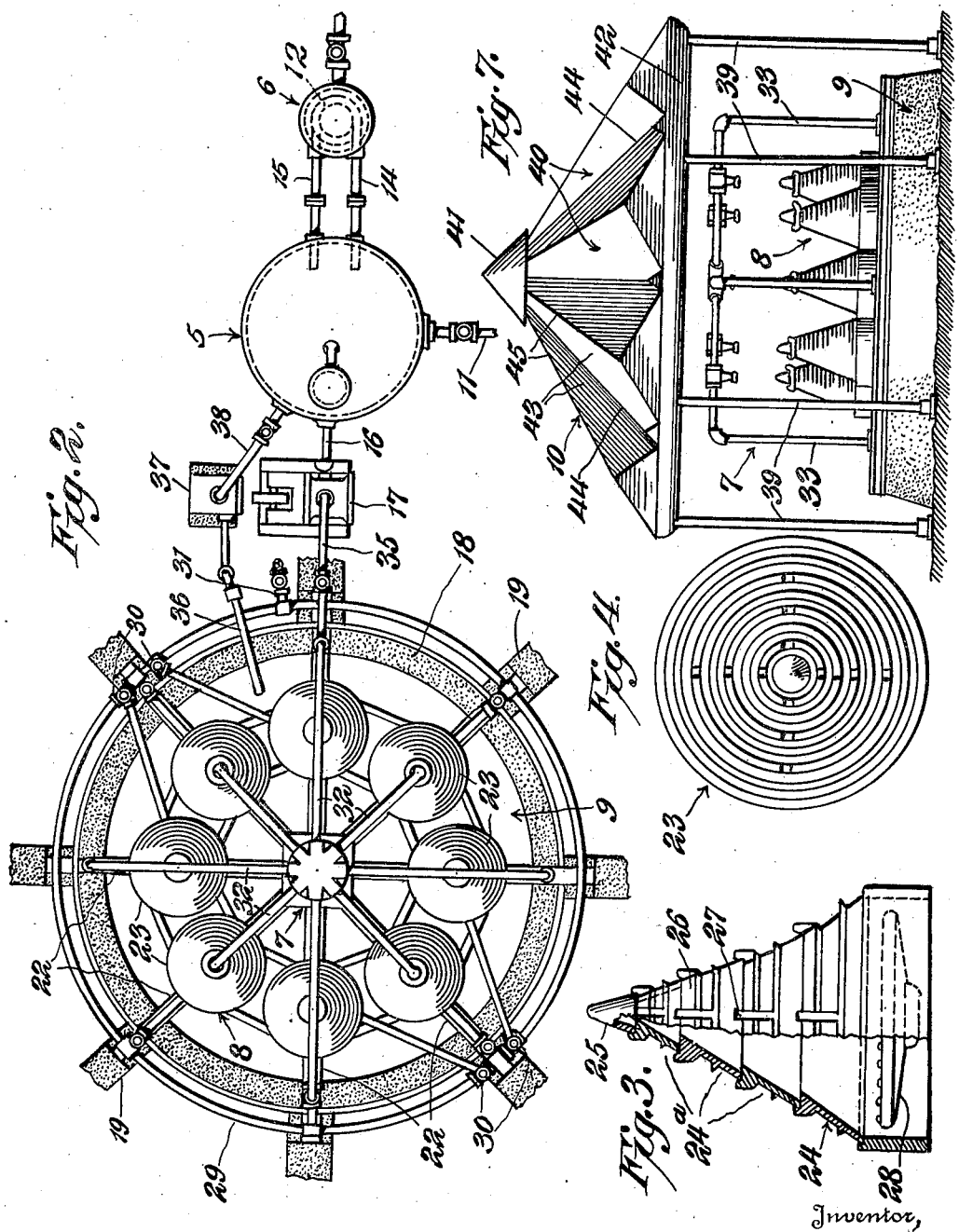
Inventor,
Amos Lea Keltner,
By Baldwin & Wight
his Attorneys.

Patented Dec. 3, 1940

2,223,488

UNITED STATES PATENT OFFICE 2,223,488

EVAPORATION PLANT

Amos Lea Keltner, Hutchinson, Kans.

Application May 20, 1938, Serial No. 209,113

6 Claims. (Cl. 159—5)

An object of the invention is to provide an evaporation plant for the disposal of salt water in which the brine supply is preheated and sprayed over a plurality of heated evaporating surfaces to flash the liquid into vapor and leave a salt residue on the evaporation surfaces.

Another object is to provide an evaporating plant of the character referred to in combination with means for condensing the flashed vapor to recover salt-free water.

Another object is to provide an evaporating plant of the character stated which is efficient, simple in construction, and economical to manufacture and operate.

Another object is to provide a method of treating salt solutions to dispose of the salt content therein, and either pass the liquid content into the air in the form of vapor, or condense such vapor into salt-free water.

Other objects will become apparent from a reading of the following description, the appended claims, and the accompanying drawings, in which:

Figure 1 is a front elevation, partly in section, of an evaporation plant constructed in accordance with my invention;

Figure 2 is a top plan view thereof;

Figure 3 is an enlarged detail elevation, partly in section, of an evaporating cone;

Figure 4 is a top plan view thereof;

Figure 5 is a reduced elevation of a condensing cover;

Figure 6 is a top plan view thereof; and

Figure 7 is a front elevation showing the cover as disposed over the evaporating cones.

Referring to the drawings in detail, my invention is shown as embodied in a liquid evaporating plant including a storage tank 5, a liquid pre-heater 6, a spray head 7, an evaporator assembly 8, a residue pit or catch receptacle 9, and a condensing cover 10.

The storage tank is mounted on the ground and is provided at its lower end with a brine pipe 11 for supplying brine from an oil well or other source. The pre-heater is disposed to one side of the storage tank and is provided with a heating coil 12 having spaced upper and lower ends 14, 15 extending into the storage tank. A heating element 16 is disposed directly under the coil and is supplied, preferably, with natural fuel gas from the oil well. The liquid in the storage tank is heated to approximately 80°–85° F. and is circulated by the convection currents set up by the heating. A discharge pipe 16 has one of its ends extending into the lower end of the storage tank and its other end connected to a circulating pump 17.

The residue pit 9 is preferably constructed of concrete, extending downwardly into the ground, and includes a cylindrical wall 18 and a plurality of spaced, radially disposed reinforcing ribs 19. A column 20 is disposed centrally within the pit and has its upper end level with the rim of the pit. A skeleton framework 21 including a plurality of radially extending arms 22 is mounted across the pit and has its center supported by the column 20. A plurality of hollow evaporating cones 23, preferably cast iron, is mounted respectively at substantially the mid point of each radial arm 22, and each cone is comprised of a frustro-conical base 24 and a plurality of superimposed successively smaller hollow frustro-conical sections 24ᵃ stacked thereon and terminating in a relatively small conical section 25. Each of the sections 24, 24ᵃ and 25 is provided with a circumferential flange 26 and spaced upstanding lugs 27 located adjacent the top of each section for retaining adjacent sections in axial alignment.

A heating element 28 is mounted under each cone 23 and is connected to a gas supply pipe 29 through a cut-off valve 30, the pipe being disposed around the periphery of the residue pit and connected to a source of gas supply 31. The evaporating cones and heating elements described above comprise the evaporating surface assembly 8.

The spray head 7 includes a skeleton structure formed of pipe comprising a plurality of radially extending arms 32 disposed over the cones 23 and terminating in downwardly extending legs 33 secured to the rim of the residue pit. An atomizing or spray nozzle 34 is located at substantially the mid point of each arm 32 and is directed towards the cone 23 therebelow. A supply pipe 35 has one end engaged in a T coupling in one of the legs 33 and its other end connected to the discharge side of the pump 17.

In operation, brine is pumped from the well into the storage tank, where it is heated to about 80°–85° F. by the pre-heater. The pre-heated brine is pumped into the spray head 7 and through the nozzles 34 which atomize the brine and direct the spray onto the evaporating cones 23 which are heated to a red heat. This causes the liquid particles to flash into vapor, leaving a residue of solid salts on the cones. The salt residue accumulates on the cones, from whence it falls into the residue pit.

Should it be desired to wash the cones 23, wash liquid is supplied to the residue pit so that it can be pumped into the storage tank through the medium of a pipe 36 having one end extending into and near the bottom of the residue pit, and having its other end connected to a small pump 37 which in turn discharges into the storage tank through a pipe 38. From the storage tank, such wash liquid is supplied under the action of pump 17 to the sprayers 34 which discharge the same onto the cones.

If it is found desirable to use the salt-free vapors for boilers or for other purposes, the condenser 10 is positioned above the evaporating assembly and residue pit. As shown in Figure 7, the condensing cover 10 is mounted on standards 39, and is located directly over the evaporating assembly, being spaced from the evaporators to provide for atmospheric cooling of the cover. In the form shown, the cover comprises a conical structure including a plurality of radially extending sections 40, a conical peak 41, and a circumferential liquid-collecting gutter 42. Each section 40 comprises a pair of slanting faces 43—43 joined along their lower edges as at 44, and joined to the adjacent section on either side along the edges 45—45. A V-shaped notch 46 is cut into each section at the outer end of the joined edge 44. A drip-catching trough 47 is disposed under each joined edge 44, and has its lower end disposed over the circumferential collecting gutter 42 to which is connected a discharge pipe 48.

When the cover 10 is in operation, the vapors contact the under surfaces of the sections 40 and are condensed. The condensed drops of liquid gravitate to the joined edges 44 from which they drip into the troughs 47 and flow down the troughs into the gutter 42. Cooling of the cover is effected by the normal atmospheric currents passing over and around it.

It will be seen that I have provided a brine evaporating plant, for use primarily with oil wells, which effectively disposes of the brine and which is simple in construction. It may also be used for obtaining salt-free water for use in boilers or the like.

The apparatus and method disclosed herein are illustrative of the invention in its at present preferred form, but various changes may be made without departing from the invention as defined in the claims.

I claim:

1. In an evaporating plant, a spray head, a hollow vertically attenuated conical evaporating element below and in line with said head, a heating means for said evaporating element so that the latter will flash-evaporate liquid, and a receptacle having an open top of greater area than the base of said evaporating element over which said evaporating element is suspended so that solids on the exterior of the evaporating element may be collected in the receptacle through said open top.

2. In an evaporating plant, a spray head, a hollow vertically attenuated conical evaporating element to receive the discharge from said head comprising a plurality of successively smaller hollow frusto-conical sections and terminating at its apex in a hollow conical section, said sections providing a substantially imperforate wall, and a collecting receptacle for solids on said evaporating element, said receptacle having an open top over which said evaporating element is suspended.

3. An evaporating plant having a receptacle open at the top for reception of solid matter, a plurality of vertically attenuated evaporating elements in spaced apart relation, heating means for the evaporating elements, an open-work structure suspending said elements over the open top of the receptacle, a skeleton framework of pipe on said structure extending over the said evaporating elements, nozzles carried by the framework of pipe, one nozzle for each evaporating element being disposed to discharge matter onto the adjacent element below it, whereby liquid in said matter will be evaporated and solids may be collected in the receptacle through said open top.

4. An evaporating plant including a receptacle open at the top for reception of solids, a plurality of evaporating elements, heating means for said elements, a structure mounted on the top of said receptacle including a plurality of radially extending arms, one of said evaporating elements being mounted on each of said arms and suspended thereby over said open top of the receptacle, a spray head on said structure comprising a skeleton framework of pipe mounted over said evaporating elements, and a plurality of radially extending pipes each of which is provided with an atomizing nozzle disposed to discharge onto the adjacent evaporating element.

5. In an evaporating plant, a spray head for spraying material to be evaporated into the atmosphere, a heated evaporating surface for contact by said sprayed material, to thereby cause all liquid of the spray to flash into vapor, a receptacle over which said surface is suspended, said receptacle being open at the top to collect solid matter from said surface, and a cover mounted over the evaporating surface and spray head and spaced therefrom to condense the vapor, said cover being alined with and of an area coextensive with said open top.

6. An evaporating plant including a receptacle for solids open at the top, a supporting structure mounted above said receptacle, a plurality of evaporating elements suspended by said structure over said open top in spaced apart relation, each of said elements comprising a hollow frusto-conical base and a plurality of successively smaller hollow frusto-conical sections stacked on said base and collectively providing imperforate walls, a heating means on said supporting structure for each of said evaporating elements, a spray head structure comprising a skeleton framework of pipe mounted over said evaporating elements, and a plurality of nozzles disposed to direct matter upon said elements respectively.

AMOS LEA KELTNER.